United States Patent
Alsup et al.

(10) Patent No.: US 9,537,776 B2
(45) Date of Patent: *Jan. 3, 2017

(54) ETHERNET TRAFFIC MANAGEMENT APPARATUS

(71) Applicant: INNOVASIC, INC., Albuquerque, NM (US)

(72) Inventors: Andrew David Alsup, Albuquerque, NM (US); Taylor M Wray, Albuquerque, NM (US); Kurt H Coonrod, Albuequerque, NM (US)

(73) Assignee: INNOVASIC, INC., Albuquerque, NM (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/841,108

(22) Filed: Mar. 15, 2013

(65) Prior Publication Data

US 2014/0269306 A1    Sep. 18, 2014

(51) Int. Cl.
*H04L 12/801* (2013.01)
*H04L 12/931* (2013.01)

(52) U.S. Cl.
CPC ............. *H04L 47/13* (2013.01); *H04L 47/10* (2013.01); *H04L 49/351* (2013.01)

(58) Field of Classification Search
CPC .... H04L 49/351; H04L 49/352; H04L 49/251; H04L 49/354; H04L 47/13; H04L 47/10; H04L 49/25; H04L 49/00
USPC ....... 370/235, 400, 229, 351, 386, 360, 389, 370/230, 412, 357, 230.1
See application file for complete search history.

(56) References Cited

U.S. PATENT DOCUMENTS

| | | | |
|---|---|---|---|
| 6,590,901 B1* | 7/2003 | Jones | H04L 47/2441 370/389 |
| 7,289,537 B1* | 10/2007 | Devanagondi | H04L 49/109 370/412 |
| 8,929,220 B2 | 1/2015 | Breternitz | |
| 2001/0012294 A1* | 8/2001 | Kadambi | H04L 49/351 370/391 |
| 2003/0200343 A1 | 10/2003 | Greenblat | |
| 2006/0168427 A1 | 7/2006 | Alsup | |
| 2006/0168429 A1* | 7/2006 | Short | G06F 15/7814 712/228 |

(Continued)

OTHER PUBLICATIONS

PCT International Search Report, PCT/US14/20523, Jul. 1, 2014.
PCT Written Opinion of the International Searching Authority, PCT/US 14/20523, I Jul. 2014.

*Primary Examiner* — Habte Mered
*Assistant Examiner* — Rownak Islam
(74) *Attorney, Agent, or Firm* — Donald J. Lenkszus

(57) ABSTRACT

An improved Ethernet traffic management device is provided comprising. a first port, a second port, and a third port. The device further comprises a first deterministic multi-threaded micro-controller controlling traffic through the first port, a second deterministic multi-threaded micro-controller controlling traffic through the second port, and a third deterministic multi-threaded micro-controller controlling traffic through the third port. The first deterministic multi-threaded micro-controller, second deterministic multi-threaded micro-controller, and third deterministic multi-threaded micro-controller cooperatively operate to selectively communicate data packets between each of the first, second and third ports.

65 Claims, 4 Drawing Sheets

(56) References Cited

U.S. PATENT DOCUMENTS

| | | | |
|---|---|---|---|
| 2009/0003364 A1* | 1/2009 | Fendick | H04L 45/00 370/401 |
| 2010/0158005 A1 | 6/2010 | Mukhopadhyay | |
| 2010/0182904 A1 | 7/2010 | Arseneault | |
| 2011/0075561 A1* | 3/2011 | Norman | 370/235 |
| 2012/0124338 A1* | 5/2012 | Webber | G06F 9/3851 712/213 |
| 2012/0131257 A1 | 5/2012 | Rudosky | |
| 2013/0064246 A1* | 3/2013 | Dharmapurikar | H04L 49/351 370/392 |
| 2013/0149912 A1* | 6/2013 | Oberski | H01R 24/64 439/676 |
| 2014/0056141 A1* | 2/2014 | Breternitz et al. | 370/235 |
| 2014/0241160 A1* | 8/2014 | Kwan et al. | 370/235 |

* cited by examiner

ETHERNET TRAFFIC MANAGEMENT APPARATUS

FIELD

The present invention pertains to packet data traffic management, in general, and to packet data traffic management for local area networks, such as Ethernet based networks, in particular.

BACKGROUND

Ethernet has long been an established standard technology in office communication. Ethernet is now being used for new applications in industrial controls and in substation automation. Ethernet has also found use in the automotive industry for diagnostic access and has been explored for further usage in vehicular applications.

Embedded Ethernet MACs and switches are utilized to provide Ethernet network connectivity to a host processor. The host processor may typically perform any number of functions such as, for example: device functions such as capturing sensor data from various sensors such as temperature sensor, accelerometer sensors, and position sensors; actuator functions such as controlling synchro motors, linear actuators, solenoids and valves; hybrid functions such as combination sensor and actuator functions; human-machine interface functions; data recorder functions; and gateway functions such as connecting multiple sensors and actuators via another communication means. Host functions may also include controller functions to control various devices and sensors; supervisory functions used for setup and maintenance of other elements on the network; and standalone subsystem functions.

The use of two-port switches in industrial networking is typical for one of two primary reasons, although they can coincide. A first reason is for providing daisy chain and ring networking topologies. Daisy chain networking reduces cabling and installation costs in many cases, eliminates dedicated infrastructure switch devices, provides a familiar installation approach, and requires a reduced cabinet footprint, i.e., a reduced infrastructure switch count. A second reason is redundancy. With appropriate network management protocols in a ring topology, the two-port switches provide no loss of functionality on a single point of failure in the network.

Specialized protocols that run on top of standard Ethernet also require a daisy-chain or ring topologies as a basic part of their operation. Such protocols include: PROFINET IRT (class C), Sercos III, EtherNet/IP DLR, HSR (a ring-redundancy protocol related to substation automation), and ETHERCAT. PRP, another redundancy protocol related to substation automation, requires two ports, but not operating as a switch.

SUMMARY

In accordance with the principles of the invention, an embodiment of improved Ethernet traffic management device is provided. The embodiment comprises a first port, a second port, and a third port. The embodiment further comprises a first deterministic multi-threaded micro-controller controlling traffic through the first port, a second deterministic multi-threaded micro-controller controlling traffic through the second port, and a third deterministic multi-threaded micro-controller controlling traffic through the third port. The first deterministic multi-threaded micro-controller, second deterministic multi-threaded micro-controller, and third deterministic multi-threaded micro-controller cooperatively operate to selectively communicate data packets between each of the first, second and third ports.

The first deterministic micro-controller may comprise a first hardware thread allocated to manage incoming data packets on the first port and a second hardware thread allocated to manage outgoing data packets on the first port. The second deterministic micro-controller may comprise a first hardware thread allocated to manage incoming data packets on the second port and a second hardware thread allocated to manage outgoing data packets on the second port. The third deterministic micro-controller may comprise a first hardware thread allocated to manage incoming data packets on the third port and a second hardware thread allocated to manage outgoing data packets on the third port.

The embodiment may comprise a single memory configured such that packet data from each of said first, second and third ports is routed therethrough. Each of the first and second hardware threads comprises an independent interface to access the memory, such that each of the first and second hardware threads does not interfere with memory accesses by others of the first and second hardware threads.

The embodiment may be configured such that the first port and the second port are each coupleable in a network configured as one of a line topology, a ring topology or a redundant star topology.

The third port is coupleable to a host processor.

The single memory is temporarily utilized at reset of the device to receive and temporarily store firmware received via one of said first, second and third ports.

The embodiment may further comprise a control register associated with one of the first, second, and third ports. The control register is utilized to selectively load the firmware from the memory to a first firmware memory associated with the first micro-controller, a second firmware memory associated with the second micro-controller, and a third firmware memory associated with the third micro-controller.

The single memory is configured such that packet data from each of said first, second and third ports is routed therethrough.

The embodiment may further comprise a set of dedicated communication queues organized to provide communication channels between each of the first, second and third deterministic micro-controllers; and the communication channels are utilized to communicate at least one of mode information and traffic control information.

The embodiment comprises a memory configured to provide a first data path, such that packet data from each of the first, second and third ports is routed therethrough; and a path is disposed between the first port and the second port to provide a selectively operable second data path between the first port and the second port that bypasses the memory.

Each of the first micro-controller and the second micro-controller comprises a corresponding receive queue and a corresponding transmit queue. Each of the first micro-controller and the second micro-controller is operable to determine that a packet received at its corresponding port is to be transmitted to the other port and to transfer that packet directly to the transmit queue of the other port.

Further in accordance with the principles of the invention, the Ethernet traffic management device comprises a single substrate on which the Ethernet traffic management device is formed.

Yet further in accordance with the principles of the invention, the Ethernet traffic management device is formed on a single substrate with the host processor.

In the embodiment, each of the first, second, and third deterministic multi-threaded micro-controllers is operable to perform one or more of modify, extend, reduce, and reformat data between one of the first, second, and third ports and another one of the first, second and third ports.

In a further embodiment of the invention, a packet data network traffic management device comprises a plurality of ports comprising at least a first port, a second port, and a third port; a plurality of deterministic multi-threaded deterministic micro-controllers, each of the micro-controllers associated with a corresponding one of the ports to control packet data through the corresponding port; and the plurality of multi-threaded deterministic micro-controllers cooperatively operate to selectively communicate data packets between the plurality of ports.

The further embodiment may comprise a single memory configured such that packet data from each of the plurality of ports is routed therethrough.

In the further embodiment, each of the deterministic micro-controllers comprises a first hardware thread allocated to managing incoming data packets on its said corresponding port and a second hardware thread allocated to managing outgoing data packets on said corresponding port.

In the further embodiment, each of the first and second hardware threads comprises an independent interface to access the memory, such that each of the first and second hardware threads does not interfere with memory accesses by others of the first and second hardware threads.

In the further embodiment, the third port is coupleable to a host processor.

In the further embodiment, the device supports a plurality of modes of operation on a packet-by-packet basis.

One mode of operation of the plurality of modes of operation is selected by said host processor.

The plurality of modes of operation comprises at least one of the device determining which port or ports out of which each data packet should be transmitted and said host processor determines which port or ports out of which each data packet should be transmitted.

The further embodiment further comprises a single memory configured such that packet data from each of the plurality of ports is routed therethrough, and each of the first and second hardware threads comprises an independent interface to access the memory, such that each of the first and second hardware threads does not interfere with memory accesses by others of the first and second hardware threads The further embodiment may comprise a set of dedicated communication queues organized to provide communication channels between each of the plurality of deterministic micro-controllers, and the communication channels are utilized to communicate at least one of mode information and traffic control information.

In the further embodiment, the memory is temporarily utilized at reset of said device to receive and temporarily store firmware received via one of said first, second and third ports.

In the further embodiment, the memory is utilized to provide one or more of maintaining a static forwarding table, maintaining dynamic forwarding table, emulating one or more protocol specific registers, maintain lists utilized for program variable maintenance.

In yet a further embodiment, the plurality of ports comprises at least a fourth port, the first port and the second port are each coupleable in an Ethernet network configured as one of a line topology, a ring topology, or a redundant star topology, and the third port is coupleable to a host processor.

In the further embodiment, the fourth port is coupleable in a network that is not an Ethernet network.

In the further embodiment, the first deterministic micro-controller comprises a first hardware thread allocated to managing incoming data packets on the first port and a second hardware thread allocated to managing outgoing data packets on the first port. The second deterministic micro-controller comprises a first hardware thread allocated to managing incoming data packets on the second port and a second hardware thread allocated to managing outgoing data packets on the second port. The third deterministic micro-controller comprises a first hardware thread allocated to managing incoming data packets on the third port and a second hardware thread allocated to managing outgoing data packets on the third port.

The further embodiment may comprise a set of dedicated communication queues organized to provide communication channels between each of the first, second and third deterministic micro-controllers. The communication channels are utilized to communicate at least one of mode information and traffic control information.

The further embodiment may further comprise a single substrate on which the packet data management device is formed.

The further embodiment may further comprise the first port and said second port each being coupleable in a network configured as one of a line topology, a ring topology or a redundant star topology, and the third port coupleable to a host processor. The first deterministic micro-controller comprises a first hardware thread allocated to managing incoming data packets on the first port and a second hardware thread allocated to managing outgoing data packets on the first port. The second deterministic micro-controller comprises a first hardware thread allocated to managing incoming data packets on the second port and a second hardware thread allocated to managing outgoing data packets on the second port. The third deterministic micro-controller comprises a first hardware thread allocated to managing incoming data packets on the third port and a second hardware thread allocated to managing outgoing data packets on the third port.

The further embodiment may comprise a set of dedicated communication queues organized to provide communication channels between each of the first, second and third deterministic micro-controllers, and the communication channels are utilized to communicate at least one of mode information and traffic control information.

BRIEF DESCRIPTION OF THE DRAWING

The invention will be better understood from a reading of the following description of preferred embodiments of the invention in which like reference designators are utilized to identify like elements, and in which.

DETAILED DESCRIPTION

Figure 1:
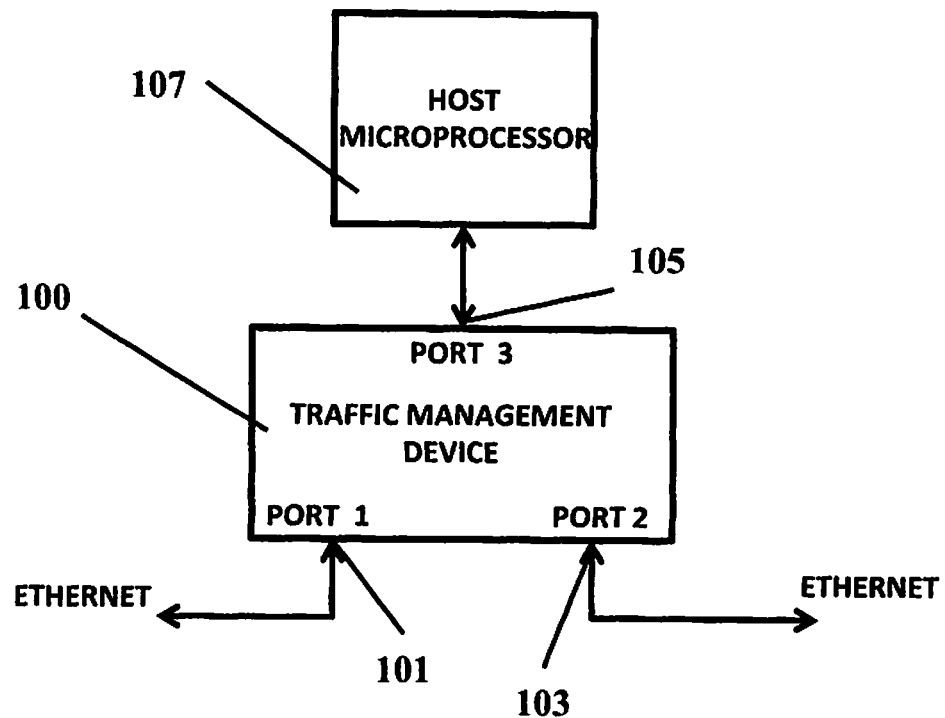
FIG. 1 is a block diagram of an embodiment of the invention.

FIG. 1 illustrates Ethernet traffic management device 100. Device 100 includes a plurality of ports, 101, 103, 105. A first port 101 and a second port 103 are coupleable into a local area network that in a first embodiment is an Ethernet type network, and as shown are coupled to an Ethernet network. The third port 105 is coupleable to and is coupled to a host processor 107.

Figure 2:
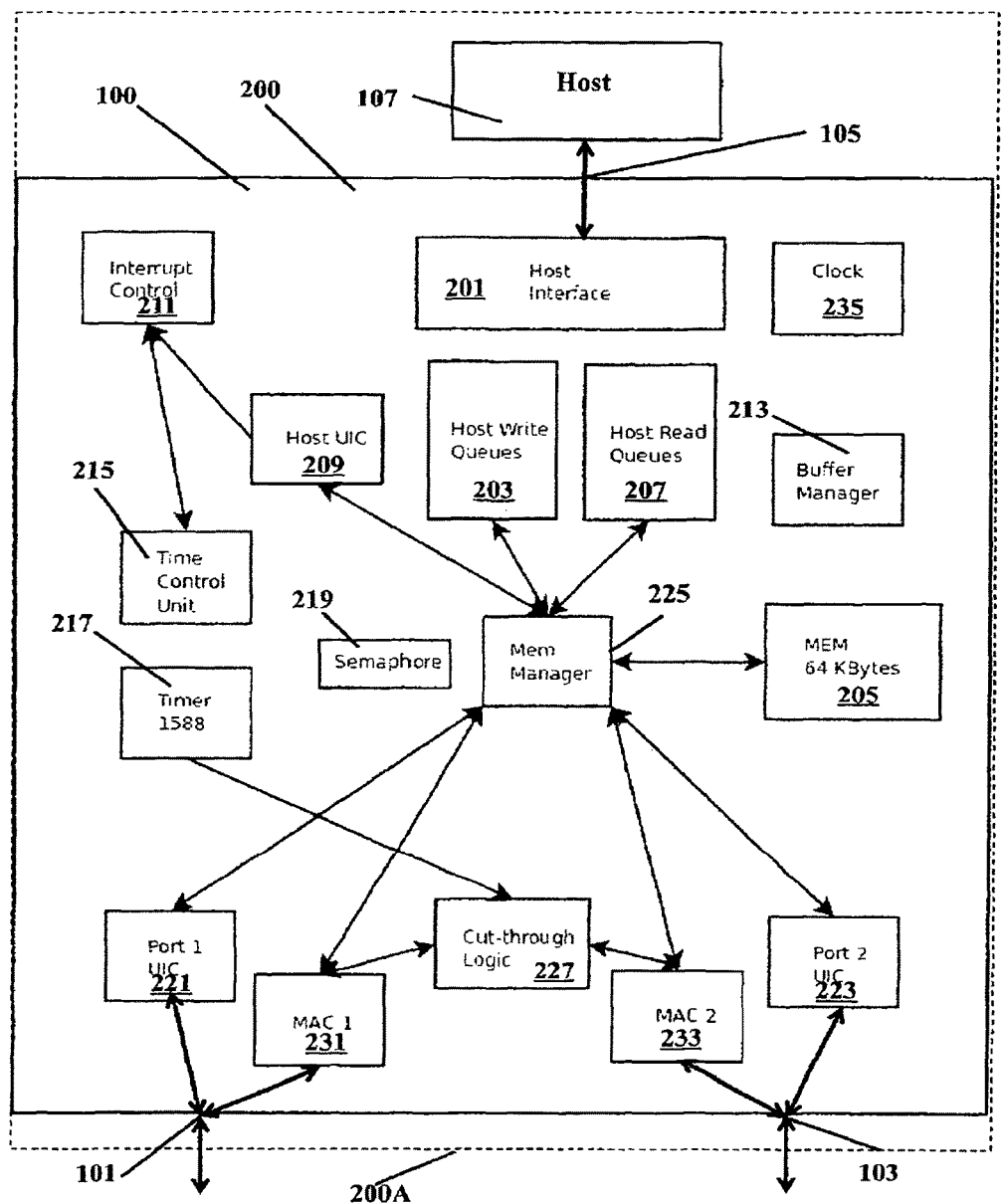
FIG. 2 is a more detailed block diagram of the embodiment of FIG. 1.

Turning now to FIG. 2, the functional blocks and connections for Ethernet traffic management device 100 are shown.

Host interface 201 provides a parallel data interface to host processor 107. Host processor 107 can read and write packet data as well as read and write various control/configuration registers via host interface 201.

Host write queues 203 are hardware queues that manage the movement of data from host interface 201 to memory 205.

Host read queues 207 are hardware queues that manage the movement of data from memory 205 to host interface 201.

Host universal I/O controller ("UIC") 209 is a deterministic micro-controller that manages and determines how to forward data written to host write queues 203 and what data to provide via host read queues 207. Host UIC 209 is also responsible for other tasks such as managing the forwarding tables, etc.

Interrupt control 211 contains logic to generate interrupts to host processor 107 over dedicated inputs/outputs, that are not shown for purposes of clarity, and provides status through registers that are accessible from host interface 201.

Memory 205 is used to store packets. It is written with packets received from host processor 107 to be transmitted, read for packets received for host processor 107 and read/written by ports 101, 103 on transmission/receipt of packets. A portion of memory 205 is reserved for communication between host processor 107 and universal input/output controllers 209. 221, 223 to, for example, forward table storage, provide timed event control, etc.

Buffer manager 213 is used by host write queues 203 and host read queues 207 and host UIC 209, port 1 UIC 221, and port 2 UIC 223 to reserve and release buffers in memory 205 as they are used for transferring packets. Memory 205 is managed as 256 256-byte blocks.

Time control unit 215 generates multiple complex, periodic sets of signals to the host UIC 209 as well as to the host processor 107 or other hardware functions external to device 100.

Timer 217 is a high precision clock with adjustable frequency and phase that is used to provide the time base to time control unit 215 as well as time-stamp incoming and outgoing packets.

Semaphore 219 is a simple block that can be used to synchronize access to various entities by host UIC 209, port 1 UIC 221, and port 2 UIC 223.

Each of port 1 UIC 221 and port 2 UIC 223 comprises a deterministic micro-controller to manage the receipt, forwarding, and transmission of packets over their respective ports.

Memory manager 225 controls access from all of the various read and write sources to memory 205.

Cut through logic 227 comprises a port 1 data manager and a port 2 data manager to each control reading of data from MAC 231 and port 1 UIC 221, MAC 233 and port 2 UIC 223, and writing of data from port 1 UIC 221 to MAC 233, and from port 2 UIC 223 to MAC 231. This path providing a lower latency for very fast forwarding of data from port to port.

Port 1 media access control MAC 231 and Port 2 media access control MAC 233 are Ethernet MAC blocks supporting 10 Mbit and 100 Mbit full and half duplex operation, as well as Gigabit full duplex operation.

The functions, connections, and interactions of the blocks of FIG. 2 are described in more detailed below.

Ethernet traffic management device 100 is programmable. During initialization, a program is loaded that controls the detailed functionality of Ethernet traffic management device 100. Thus, there is a different program loaded into device 100 to determine its functionality. For example, device 100 may be programmed at initialization to provide functionality for a standard switch, a switch suitable to operate in a PROFINET Class C network, an HSR network, and for numerous other functions. The program is executed by a set of deterministic micro-controllers, i.e., one in each major interface: host UIC 209, port 1 UIC 221, and Port 2 UIC 233. The hardware of Ethernet traffic management device 100 can be differentiated to limit the types of firmware that can execute on it. This allows the restriction of royalty payments for specific features to those switches that are actually intended to execute firmware that exercises the feature in question, e.g., ETHERCAT Slave Controller.

In the embodiment of FIGS. 1 and 2, Ethernet traffic management device 100 utilizes a single 25 MHz input clock 235 supplied by an oscillator or a crystal. Most internal operation of Ethernet traffic management device 100 is at 125 Mhz. A 25 MHz output clock signal is provided, e.g., to drive external physical layer PHY chips, along with a 50 MHz clock for an reduced media independent interface RMII interface and 125 MHz clock output for a gigabit media independent interface GMII interface. All clock outputs are disabled by default and can be left inactive if not needed.

Host interface 201 comprises a parallel bus. In addition, host interface 201 comprises a plurality of registers including a host control register that are accessible by host processor 107 to set up operation of Ethernet traffic management device 100. Ethernet traffic management device 100 operates like an asynchronous random access memory RAM on host interface 201 with the following parameters:

16 or 32-bit data bus, selectable via setup pin;
9 address lines-least significant bits lsb of address=32-bit word;
12 nsec chip-select to data valid on read;
12 nsec chip-select to write complete on write;
20 nsec full period, i.e., host processor 107 can execute a read or write every 20 nsec; and
Big Endian or Little Endian byte ordering, selectable via setup pin.

The parallel bus of host interface 201 allows for a bandwidth to/from the switch of 200 Mbytes/second (1.6 Gbit/sec) for a 32-bit data bus, 100 Mbytes/second (800 Mbit/second) for a 16-bit data bus.

Figure 3:
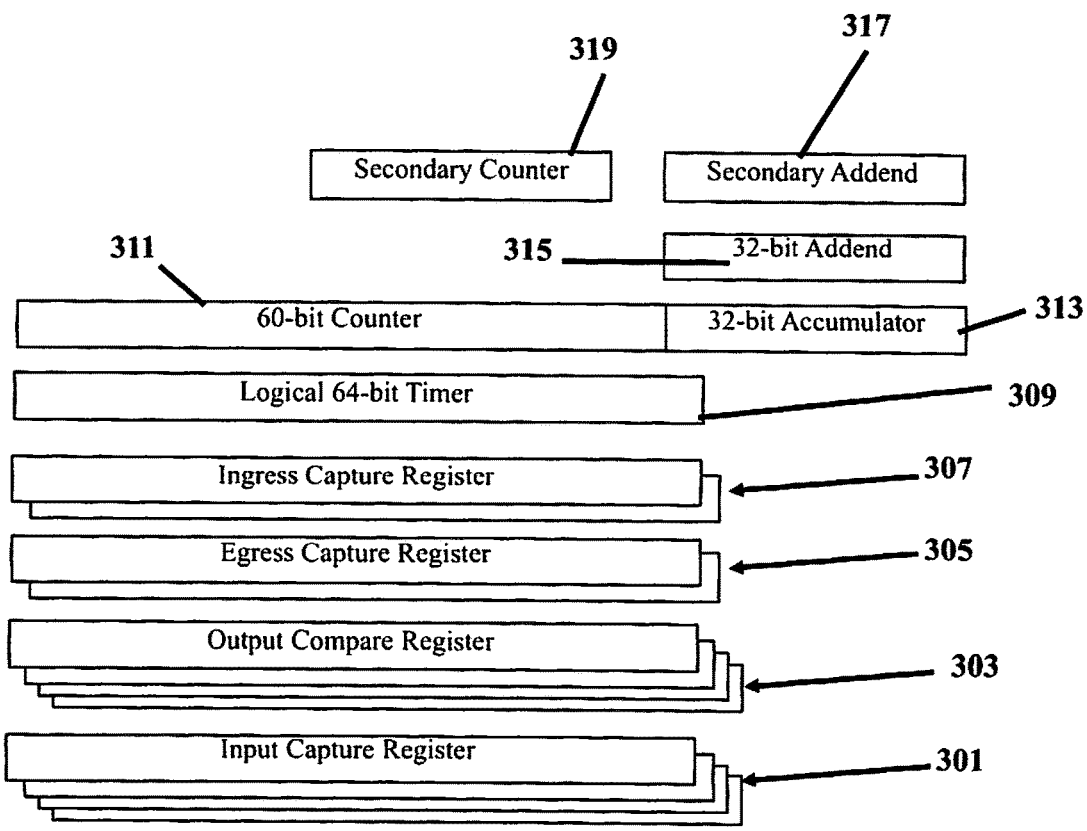
FIG. 3. illustrates register structures utilized in the embodiment of FIG. 2.

Ethernet traffic management device 100 comprises additional control/status registers, some of which are shown in FIG. 3. The various control/status registers are each 16-bits wide. If a 32-bit data bus is used, the upper 16-bits are ignored on write and treated as zeros on read. Various data registers such as those used in host write queues 203 and host read queues 207 match the data bus width, i.e., 16 bits used on a 16-bit bus and 32-bits used on a 32 bit bus.

Ethernet traffic management device 100 is configurable via addressable access to its various elements including the host control register located in host interface 201, a host write queue 203, and a host read queue 207 as described below.

The host control register in host interface 201 is used to:
Identify the interface type for the physical layer PHY connection on each port 101, 103 (reduced media independent interface RMII/media independent interface MII/gigabit media independent interface GMII);
Manage loading of firmware;
Perform a soft reset on Ethernet traffic management device 100; and
Enable output clock timer 215

Host write queues 203 and host read queues 207 provide an interface that allows host processor 107 to access memory that is internal to the switch where protocol-specific features are implemented, along with requesting addition of addresses to the forwarding tables (static and dynamic), etc.

Host write queues 203 and host read queues 207 are arranged as a set of 8 read and write pairs of queues to allow for differentiation of Ethernet packets based on priority and/or type. The allocation of message types to queues and the number of queues in use is protocol-specific.

Host write queues 203 operation is data-driven. That is, the first word written to the head of host write queues 203 is a command word (16-bits). This command word includes two fields of import to host processor 107:
Time Stamp Request flag—this bit is used to indicate that the egress time of the packet should be captured by the transmitting port(s) and retained for later retrieval by the host.
Transmit Command field—this two-bit field is used to indicate to the Ethernet traffic management device 100 how to handle the packet
00→device 100 will determine which port or ports on which to transmit the packet;
01→transmit the packet out port 1;
10→transmit the packet out port 2; and
11→transmit the packet out both port 1 and port 2.

Other bits in this word are used internally by Ethernet traffic management device 100.

As is evident from the transmit command field, host processor 107 may select one or both ports to transmit the packet out or allow Ethernet traffic management device 100 to determine the port or ports to transmit the packet.

The second 16-bit word written to Ethernet traffic management device 100 for a packet, or the least significant 16-bits of the first long-word if the data bus is 32 bits wide, is the byte count for the packet.

Following those fields, host processor 107 simply writes the packet data to the queue. When the indicated number of bytes, rounded up to the bus word-size, has been written, the next word written to the queue should be the command word for the next packet.

Because there is a plurality of queues, a low priority process on host processor 107 can be writing a packet to one queue and that operation can be interrupted at any time and a higher priority queue can be written.

The read operation of the queues is similar. An interrupt, described below, is provided to indicate that there are one or more packets in host read queues 207. The first 16 bits read from host receive queues 207 is a receive status word with the same basic format as a command word. In this case, the transmit command field is re-purposed to indicate which port the packet was received on. Following the receive status word is a byte count, indicating how many data bytes follow. This allows host processor 107 to read these first words then set up a direct memory access DMA process to finish reading the packet.

For all received packets, the first 8 bytes following the packet size is an ingress timestamp.

There is an 8-bit field available in both a transmit command and the receive status words that can be used for protocol-specific needs managed by firmware in the Ethernet traffic management device 100.

Control registers, that are not shown, are provided to allow manipulation of the host write queues 203 and host read queues 207 so that only those queues needed for a particular protocol are enabled. A packet memory overhead is associated with any enabled transmit queue on host interface 201, if the queue is not enabled, this space is freed for use by other queues.

Also provided are control bits that allow the flushing of packets and queues. This allows for particular queues to be flushed if host processor 107 is overwhelmed by traffic while not sacrificing any data in high priority queues. Individual packets at the head of the queue can be flushed as well.

Host interface 201 provides access to IEEE 1588 standard precision time protocol PTP timer 217 functionality. This includes read/write access to the base 64-bit timer 217 and access to 32-bit addend registers in timer control unit 215 to tune the frequency and phase of timer 217.

Besides base timer 217, there are four input capture registers 301 shown in FIG. 3 that can be used to time signals on dedicated input pins on Ethernet traffic management device 100 and four output compare registers 303 to generate output transitions at specific times. These functions are based on a main 64-bit timer 305 and use a set of four dedicated I/Os. Each pin is allocated to either an input capture register 301 or an output compare register 303.

Host processor 107 can also access one of two egress time registers 307 each associated with one of port 1 101 and port 2 103. Egress time registers 307 each stores the egress time of the most recent packet for which egress timing was requested. Similarly, two ingress time registers 309 each store the ingress time of the most recent packet for each of port 1 101 and port 2 103.

Time control unit 215 is programmed by host processor 107. Host processor 107 downloads a program to time control unit 215 via host interface 201. Typically this is done some time after Ethernet communications have begun to allow the timing parameters to have been communicated to host processor 107 before programming time control unit 215.

A set of 4 output pins is provided on Ethernet traffic management device 101 that can be used to generate waveforms in synchronization with the PTP clock 235 and the rest of the timing programmed into the time control unit 215. For example, if a particular message is to be sent on a periodic basis, and this timing is entered into the time control unit 215, one of these signals could be used to interrupt host processor 107 a fixed period of time before the message is transmitted to allow it to be written to an appropriate queue.

One of the first things that is be accomplished following a reset of Ethernet traffic management device 107 is loading firmware. Firmware is written to memory 205 via host interface 201, then the host control register of host interface 201 is used to begin the process of loading downloaded firmware from memory 205 to the various UIC 209, 221, 223 micro-controllers.

Host processor 107 is provided access via host interface 201 to MAC 1 231 and MAC 2 233 to allow setting configuration and control, e.g., setting duplex and rate.

A higher level control of port 1 101, and port 2 103, permits management of port operation. This includes setting port state, e.g., forwarding, blocking, etc., setting timing parameters for timer 217, e.g., peer delay times, and the like.

Because Ethernet traffic management device 100 is programmable and designed to support a wide range of protocols, a flexible interrupt structure is also provided via interrupt control 211.

Interrupt control 211 provides three interrupt outputs. A rising edge at these outputs indicates an interrupting condition.

The following list includes the set of events that can generate an interrupt:

Host Interface 201 events:
Queue 0 packet ready
Queue 1 packet ready
Queue 2 packet ready
Queue 3 packet ready
Queue 4 packet ready
Queue 5 packet ready
Queue 6 packet ready
Queue 7 packet ready
Queue 0 space available
Queue 1 space available
Queue 2 space available
Queue 3 space available
Queue 4 space available
Queue 5 space available
Queue 6 space available
Queue 7 space available
Timer 217 Events:
Compare Unit 0 event
Compare Unit 1 event
Compare Unit 2 event
Compare Unit 3 event
Capture Unit 0 event
Capture Unit 1 event
Capture Unit 2 event
Capture Unit 3 event
Time Control Unit 215 Events:
TC Signal 0 event
TC Signal 1 event
TC Signal 2 event
TC Signal 3 event
Programmable Events:
Host port event
Port 1 event
Port 2 event Any of these events can be routed to any of the 3 interrupt outputs and independently enabled or disabled.

Flag registers provided in interrupt control 211 are provided on a functional basis to allow host processor 107 to distinguish the immediate reason for the interrupt. A write-back from host processor 107 via host interface 201 is used to clear an interrupt condition. Providing the write-back clear allows for different interrupt lines to share status registers. High and low priority queue events may be provided even though they are in the same status register.

Host interface 201 is managed by dedicated hardware to provide the performance necessary and host UIC 209 comprises a deterministic micro-controller dedicated to host port 105. The deterministic micro-controller comprises an 8-bit processor that has two hardware threads. Each thread executes an instruction on every other clock cycle. The threads are allocated as one dedicated to managing packets directed to host processor 107 and the other thread manages packets written by host processor 107.

The 8-bit processor operates at 125 MHz, with all instructions requiring a single clock. Thus each thread effectively operates at 62.5 Mhz. The processor comprises 32 general-purpose registers that are shared between the threads, along with a number of special-purpose registers and a separate register bank that allows access to and control of various other parts of Ethernet traffic management device 100.

Packet memory 205 is accessed via a pair of queues, i.e., host write queue and host read queue 207, one read and one write for each thread for a total of 4 queues. Utilizing host write queue and host read queue 207 permits host UIC 209 processor to read and/or modify packets as necessary.

Host write queue and host read queue 207 hardware place packets into memory 205 as a set of linked buffers, described below. Firmware is able to "switch" packets by forwarding only an 8-bit packet identifier to allow control transfer between these elements. Messaging queues are provided between the micro-controllers in each of the host UIC 209, port 1 UIC 221, and port 2 UIC 223.

Each micro-controller in each of the host UIC 209, port 1 UIC 221, and port 2 UIC 223 also receives a set of discrete signals from the time control unit 215 to allow precise timing of various functions.

Host UIC 209 micro-controller performs protocol-specific functionality on host interface 201 as well as other more basic functions. Foremost among these is maintenance of a dynamic MAC address table. As packets are received on Ethernet ports 101, 103, host interface 201 is alerted, and port/MAC address information is added to a table. Host UIC 209 micro-controller also manages aging of table entries, flushing the table, etc. This approach allows the size and organization of an address table to be modified as appropriate for a particular application. A typical default would be 128 entries organized in a hashed table with 4 entries per hash.

Ethernet traffic management device 100 is designed around a single logical memory 205 through which all packet data is routed. Memory 205, in the embodiment, is 64 Kbytes organized 64-bits wide. Memory 205 is able to manage a single operation (64-bit read or write) on each 125 MHz clock cycle. This provides a basic bandwidth of 8 Gigabit/second.

Users of memory 205 include the following:
Ethernet Port 1 Transmit—max 1 Gbit/second
Ethernet Port 1 Receive—max 1 Gbit/second
Ethernet Port 2 Transmit—max 1 Gbit/second
Ethernet Port 2 Receive—max 1 Gbit/second
Host Parallel interface (read or write)—max 1.6 Gbit/second Memory 205 is utilized as a set of 256, 256-byte buffers. A subset of the buffers are reserved during switch initialization to serve as dynamic and static lookup tables. Some additional space is reserved for other protocol-specific communications.

A portion of memory 205 is reserved to define actions to take on events received from the time control unit 215.

For most applications 8 to 16 buffers are statically allocated, leaving 60-62 Kbytes for packet management.

The buffers of memory 205 are allocated through a hardware block, i.e., memory manager 225, that is accessed by the various ports 101, 103, 105 that populate memory 205. This memory manager 225 hardware block acts as a free list, returning an 8-bit identifier, i.e., the top 8-bits of the address of the block, when a buffer is requested. The memory manager 225 hardware associated with these elements is able to write the data to the buffer space and maintain a header at the beginning of each one that indicates the total number of bytes in the packet, number of bytes in the buffer, whether there is a checksum on the packet, whether there is a timestamp in the header, whether an egress timestamp should be latched, and the identifier of the next buffer in the list for packets that do not fit in a single buffer.

After a packet is placed in memory 205, the micro-controller on the receiving port determines which other port or ports to forward the packet to. When a receiving port micro-controller determines that it will transmit a packet, the identifier is provided to the port hardware which can then follow the linked list of buffers to transmit the packet.

When a packet has been disposed of, i.e., all ports that it was forwarded to are done operating on it, the micro-controller on the last port to finish with it will traverse the buffers in the packet and return them to free list hardware.

For cut-through packets the operation is somewhat different because the headers of the buffers are not complete when packet transmission is begun. Special registers provided in cut through logic 227 are provided to communicate between the two Ethernet ports 101, 103 to manage the packet size and any detected errors.

Port 1 101 and port 2 103 are functionally identical. Each has an Ethernet MAC 231, 233 that supports RMII (10 Mbit or 100 Mbit) and GMII/MII (10/100/1000 Mbit). RGMII and other low pin-count Gigabit interfaces are not supported.

Ethernet MACs 231, 233 support reception and transmission of truncated preambles.

A first thing that occurs as a packet is received is that a timestamp is captured from main timer 217. The capture is made as a start frame delimiter SFD is recognized on the interface to the PHY. This value is written to the data buffer that the packet data will be placed in by buffer manager 213. All packets received on an Ethernet port 101, 103 have a timestamp captured.

As bytes are received through a MAC 231, 233, they are queued up at the port to be transferred, i.e., the data will be written in 64-bit blocks to the packet memory 205. In addition to being queued up, the first 32 bytes of the packet are kept locally at the receiving port to allow the receive thread on the receiving port micro-controller to evaluate the packet and make a forwarding decision rather than waiting for the head of the packet to be written to packet memory 205 then reading it back to the micro-controller for evaluation.

If Ethernet traffic management device 100 is operating in cut-through mode and a receiving port 101 or port 103 determines that a received packet should be forwarded to the other Ethernet port 103 or 101, then the address of the first buffer in the packet is written to the other port's micro-controller via a dedicated communication first in first out FIFO memory included in cut-through logic 227. That micro-controller makes a decision whether to begin transmission immediately or not. If immediate transmission is appropriate then the address of the data is provided to the local port hardware which will begin transmission when commanded. From this point on there is a hardware handshake between the two ports that manages the total number of bytes to transmit and handles the case of an incomplete frame, run-on frame, or incorrect CRC. The locations of succeeding buffers is included in the header of the buffers consumed by the transmitting port hardware.

There are other things that are accomplishable at this point:

If operating as a one-step transparent bridge, the transmitting micro-controller will retrieve the correction field from the original packet and place it in a hardware structure that will calculate the new correction field value and place it at a packet offset indicated by the micro-controller when transmission takes place.

The transmitting micro-controller can alter the flow of buffers by manipulating the headers to inject local data in to the packet stream (e.g. for PROFINET dynamic packets or Ethercat packets).

Forwarding a packet to host processor 107 is similar in that the identification of the first buffer for the packet is forwarded to host processor 107 through a dedicated messaging FIFO memory associated with host UIC 209. Host UIC 209 micro-controller evaluates the packet and determines which queue in host read queues 207 it should be assigned to. When the packet is received in host read queues 207, host processor 107 is alerted to read the packet.

Similarly, when transmitting packets written by host processor 107, transmission is not initiated until the entire packet has been written to host write queues 203 to avoid starving the destination Ethernet port or ports 101, 102.

The foregoing operation is programmable and can manage typical traffic management behaviors including priority queuing on a transmit port, e.g., VLAN or differentiated services, and selective forwarding of multicast packets based on the STATIC MAC table The core of PTP timer 217 is a 60-bit counter 311 driven by a 32-bit accumulator 313 shown in FIG. 3. The selection of the 60-bit counter size is driven by the base clock rate of 125 Mhz. A 32-bit addend 315 is added to accumulator 313 every 8 nsec. This is scaled so that the accumulator 313 represents an appropriate approximation of 8 nsec as necessary to tune the clock 235 to match a master such as, e.g., a GPS signal. The overflow of the accumulator 313 is used to increment 60-bit counter 311. Thus, 60-bit counter 311 along with the most significant 4 bits of accumulator 313 provides a tuned timer 217 with a least-significant bit of 1 nanosecond.

When timer 217 is read by host processor 107 this is the 64-bit value that is returned. When timer 217 is written it is the value that is provided. When reading timer 217 a single value is latched on the first access so that a coherent value is read. Similarly, when writing the set of 4 16-bit registers that provide access over host interface 201, the new value is not applied until the entire 64 bits has been written.

A secondary addend register 317 is provided along with a 32-bit counter 319. This allows for precision phase adjustment of timer 217. The secondary addend register 317 is added to accumulator 313 rather than the primary addend 315 for a count equal to the value in a secondary counter 319. For example, if a value of 300 is put into the counter, secondary addend register 317 is used in place of the primary addend 315 300 times, then the primary addend 315 is used again.

Besides timer 217, there is a set of 4 output compare registers and 4 input capture registers. These share a set of four I/O pins on the switch, one input capture channel and one output compare channel per pin, so generally only one function or the other will be active at any time.

Additional registers are provided to capture ingress and egress times for packets on the Ethernet ports 101, 103.

The overflow of the accumulator is also used to drive the base counter of time control unit 215.

Figure 4:
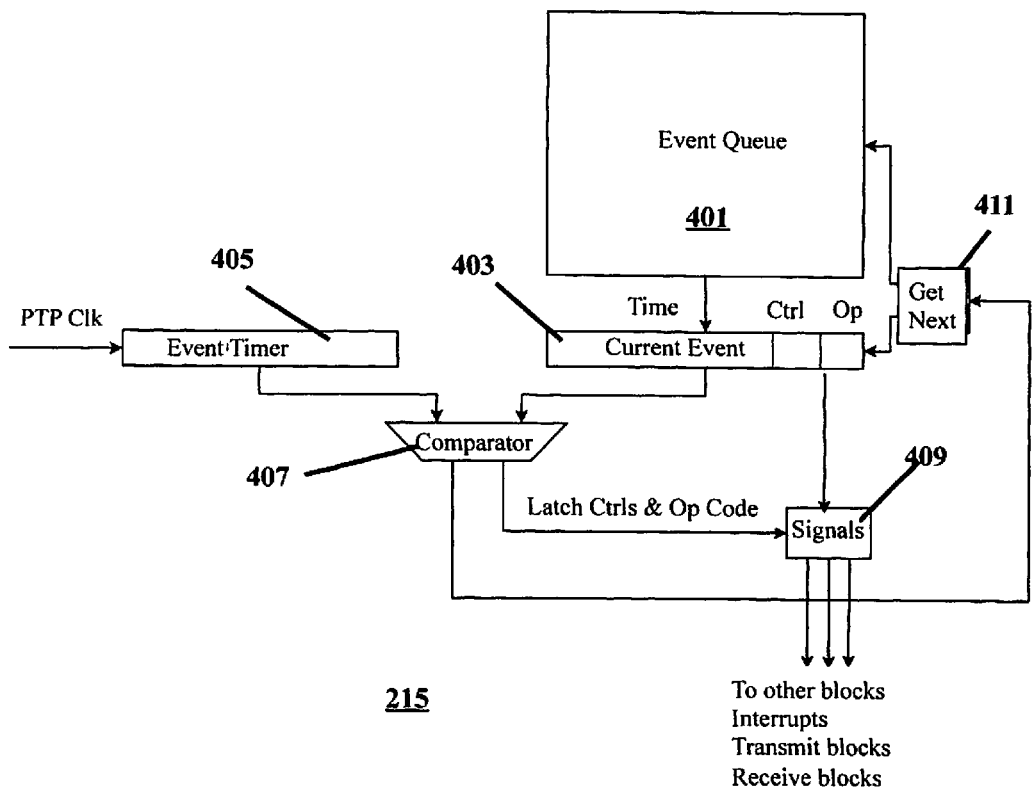
FIG. 4 is a block diagram of a portion of the embodiment of FIG. 2.

Time control unit 215 provides a set of signals in a programmable repeating pattern. As shown in FIG. 4 time control unit 215 comprises an event queue 401. Event queue 401 is a memory that can store a set of up to 512 sequential "events". The first command in an event list, is loaded into a current event register 403. The event consists of a 32-bit time value, a set of control signals, and an op-code. The time value in current event register 403 is compared with the contents of event timer 405 by comparator 407. When a match is detected, the control signals 409 associated with the event are applied and the op-code is executed. The op-code consists of two bits with the following meanings: bit 0—go to next entry in the list or go to beginning of list, bit 1—apply control signals or don't apply signals.

The supported signals include
2 signals to Port 1 UIC 221 micro-controller
2 signals to Port 2 UIC 223 micro-controller
4 signals to dedicated external timer pins
1 signal which can be used to clear the Event Timer Event timer 405 is a counter which is incremented by the overflow of a timer 217 accumulator so that it has the same frequency as PTP timer 217. Output compare registers 303 shown in FIG. 3 and described above can be used to synchronize event timer 405 to a specific starting point. Typically the starting point is after the PTP timer 217 has been synchronized with a master and event queue 401 has been programmed.

The operation of the timed functionality is based on the control signals generated by time control unit 215 in combination with a set of corresponding lists provided to each of port 1 UIC 221 micro-controller and port 2 UIC 223 micro-controller. So a list is generated in a reserved section of memory 205 with a set of commands/signals for port 1 UIC 221 micro-controller and port 2 UIC 223 micro-controller to execute based on the control signals.

The two control signals per each port 1 UIC 221 micro-controller and port 2 UIC 223 micro-controller are intended to be used as one for the transmit thread and one for the receive thread, then when port 1 UIC 221 micro-controller and port 2 UIC 223 micro-controller each sees a transition on the signal it will read the next command in its list, i.e., receive command or transmit command, and take the appropriate action.

The signals that are driven externally can be used for any purpose, but they are especially intended to interrupt the host processor on a periodic basis.

The first embodiment is an Ethernet traffic management device 100 with two Ethernet ports 101, 103 and an interface 201 for a host processor 107 coupled to port 105. Host interface 201 comprises a parallel interface, looking like a slave on host processor 107 main local bus similar to a memory device/etc.). Other embodiments support other, more specific interfaces PCI, PCIx, PCIex, etc. Yet further embodiments are included in a system on a chip SOC talking to an internal bus, e.g. the advanced micro-controller bus architecture AMBA bus used in advanced risc machine ARM SOC devices.

Ethernet traffic management device 100 may operate like an Ethernet switch, switching packets among the three ports 101, 103, 105 (2 Ethernet ports and the host interface port). This type of device with 2 Ethernet ports is important in certain application areas where the network topology is defined as a line (or daisy-chain) topology or a ring topology or a redundant star topology.

A two Ethernet port approach is widely used in industrial applications of Ethernet where it helps to reduce cable length and simplify installation. It also eliminates the cost of large 'infrastructure' switches. It is likely to play an important role in some emerging markets for Ethernet such as automotive.

There are a number of Industrial Ethernet Protocols that have been developed to serve the market. Representative of the protocols are:

Modbus/TCP
EtherNet/IP
PROFINET Class B
PROFINET Class C (also called PROFINET IRT (Isochronous Real-Time))
ETHERCAT
SERCOS III
Ethernet POWERLINK
IEC 61850

Ethernet traffic management device 100 is programmable to be utilized with all of the above protocols.

In addition to the communication protocols listed above, there are specific protocols used for managing the topology in various ways. The topology protocols are:

Rapid Spanning Tree Protocol (RSTP)
Media Redundancy Protocol (MRP)
Media Redundancy for Planned Duplication (MRPD)
Device-Level Ring (DLR)
High-Availability Seamless Redundancy (HSR)
Parallel Redundancy Protocol (PRP)
Simple Network Management Protocol (SNMP)
Link-Level Discovery Protocol (LLDP)

Generally, the communication protocols are associated with one or more of the topology protocols. For example, PROFINET IRT is associated with MRP, MRPD, LLDP, SNMP and various others; IEC 61850 is associated with SNMP, HSR and PRP.

These protocols impose different, often conflicting, requirements. However, Ethernet traffic management device 100 is programmable such that the conflicting requirements are programmable into Ethernet traffic management device 100.

Ethernet traffic management device 100, with its programmable flexible architecture accommodates the following:

Cut-through or store and forward (in some protocols both approaches are used at different times).
Multiple different forwarding algorithms that may be different both between protocols and within a single protocol. By way of example, the forwarding rules for PROFINET IRT differ depending on what time it is.
Multiple Precision Time Protocol (PTP) operating modes, such as, for example, peer-to-peer, end-to-end, and one-step/two-step.
Differing requirements on forwarding times.
Multiple protocols that involve modifying packets on the fly (PROFINET IRT, ETHERCAT, SERCOS III).

In addition, Ethernet traffic management device by virtue of its programmability is adaptable to manage emerging standards being developed for the automotive market as well as other markets.

As pointed out hereinabove, port 1 UIC 221, port 2 UIC 223 and host UIC 209 are restricted to two hardware threads at all times.

This dual-thread architecture is a significant aspect to operation of Ethernet traffic management device 101. In the embodiment, one thread is dedicated to managing packets received on a port 101, 103, 105 while the other thread manages the transmit path. The threads are managed in hardware such that each thread executes an instruction on alternating clocks. By managing the threads in hardware, operation of Ethernet traffic management device is deterministic. Thus a single micro-controller is not juggling both processes in software. The result is that the micro-controllers are deterministic. This avoids having to use two micro-controllers per port.

The three UICs, i.e., port 1 UIC 221, port 2 UIC 223, and host UIC 209, can communicate with each other via a set of dedicated communications queues. These queues are 8 bits wide (the UICs are 8-bit micro-controllers) and are organized such that there is a communications channel from Host UIC 209 to each of port 1 UIC 221 and port 2 UIC 223, from each port UIC 221, 223 to host UIC 209, and from each port UIC 221, 223 to the other. These are used to communicate mode information as well as to forward packets. Other types of communication are also provided, e.g., pass packet address for learning, reset a port, set port state, set connection status (speed and duplex), and enable/disable cut-through operation.

Another feature of the micro-controllers is their mechanisms for accessing the main packet memory 205. Each thread of each micro-controller has an independent interface to memory 205 for both read and write. This contributes to the high performance and deterministic operation of Ethernet traffic communication device because the threads do not interfere with each other in terms of memory accesses.

Hardware semaphore 219 manages resource allocation among the various UICs 221, 223, 209 as well as the threads operation on UICs 221, 223, 209. This allows use of shared locations in memory 205, allows packet data in memory 205 to be shared among ports 101, 103, 105 rather than copied to each transmitting port.

Host interface 201 includes multiple separate queues for transferring data to/from host processor 107. Further, if host 107 is reading or writing on one queue, that process can be interrupted by a sequence of accesses to a higher priority queue, then resumed when the high priority read or write is complete.

Host UIC 209 evaluates packets forwarded to it by port 1 UIC 221 and port 2 UIC 223 and determines what priority, i.e., which queue, each packet should be sent to. This determination is programmable and is based on the specifics of the protocols that are in operation.

Ethernet traffic management device 100 provides priority queuing to the priority order that packets should be handled with on host processor 107. Ethernet traffic management device 100 clues specific to a particular protocol/application to perform the queuing to the advantage of host processor 107 and the overall system.

Multiple interrupt outputs are provided from Ethernet traffic management device 100 to host processor 107, allowing prioritization to be carried into the host processor, managing different priorities of data in differently prioritized interrupt handlers.

Time control unit 215 is programmable and is utilized in management of several protocols. It is used in coordination of many precise time-based actions.

A feature of Ethernet traffic management device 100 is that there are multiple paths for data to traverse from one Ethernet port 101, 103 to the other port 103, 101. The standard path is for a receiving port to place the packet into the shared memory 205 and the transmitting port to read the packet from memory 205 for transmit.

For some protocols, this path involves too much latency. The memory path has a high latency because of wide word size (8 bytes) to manage the high bandwidth requirements of the switch. For low latency protocols, especially ETHERCAT and Ethernet POWERLINK, Ethernet traffic management device 100 provides a secondary path.

The majority of packet data traffic is routed through memory 205. However, for certain cases, such as, specific protocols and cases where packets are modified en-route, a secondary pathway is provided between the two Ethernet ports 101, 103.

By way of example, port 1 UIC 221 can read the data received on port 101 from a special queue 1 byte at a time. It can also write this data to transmit port 103 through another queue. Thus UIC 221 can examine a received packet and forward it to port 103 with very low latency.

Each of port 1 UIC 221 and port 2 UIC 223 comprises a receive queue and a transmit queue. The micro-controller in each of Ethernet port 1 UIC 221 and Ethernet port 2 UIC 223 is able to directly read received packet data received at its corresponding Ethernet port 101, 103 directly from its corresponding port 101, 103 via Ethernet MAC 1, 231 and Ethernet MAC 2, 233. Upon receipt of packet data at an Ethernet port 101, 103, the corresponding micro-controller can write that packet data to the transmit queue associated with the other port UIC via cut-through logic 227. Providing this direct alternate path in Ethernet traffic management device 100 dramatically reduces the latency across Ethernet traffic management device 100 and gives each Ethernet port UIC 221, 223 full control over received packet data so that the packet data can, for example, be modified on the fly.

When one of port 1 UIC 221 or port 2 UIC 223 utilizes the direct path through cut-through logic 227 to transfer packet data to the other Ethernet port, the packet data is also typically copied into memory 205. If the packet data is to be transferred to host port 105 as well, the copy stored in memory 205 is used. If the packet data is not to be transferred to host port 105, it is not used.

To provide this alternate packet data path, each of port 1 UIC 221 and port 2 UIC 223 comprises a receive data queue on the Ethernet port receive path. Received packet data at a port is duplicated into the ports corresponding receive data queue.

Each of port 1 UIC 221 and port 2 UIC 223 comprises a receive read register that allows its corresponding micro-controller to read it corresponding receive data queue.

Each of port 1 UIC 221 and port 2 UIC 223 comprises a transmit data queue on the Ethernet port transmit path. Packet data may be written directly into the queue from the receive queue at the other port rather than being written into from memory 205.

Each of port 1 UIC 221 and port 2 UIC 223 also comprises a transmit register that allows the opposite port's processor receive side to write data to the other port UIC transmit side queue for transmission out of its corresponding Ethernet port.

Meanwhile the data is also written to memory 205 in case it needs to be forwarded to the host Interface 201 as well.

This data path is also utilized to dynamically modify packets as required by several protocols such as, for example, ETHERCAT, SERCOS III, and PROFINET IRT. In the case of ETHERCAT and SERCOS III, as packets traverse Ethernet traffic management device 100, the receiving UIC 221, 223, 209 will, at specific locations in the packets, discard the data already there and replace it with data provided by host processor 107 and residing in memory 205. In some cases on ETHERCAT packets Ethernet traffic management device 100 will modify the data in the packet in various ways.

In PROFINET IRT a transmission of certain packets will begin with data placed in memory 205 by host processor 107, then when this data has been transmitted it has data that is currently being received on the other ETHERNET port appended to it.

There is also a path that allows a port UIC 221, 223 to take data received on that port and quickly retransmit it back out on the same port. This is important for ETHERCAT.

In a further embodiment of the invention, an addition Ethernet port and associated UIC may be provided for test and maintenance or as a gateway into a different Ethernet protocol regime.

In the embodiment of FIGS. 1 and 2, Ethernet traffic management device 100 is formed on a single substrate 200 as shown in FIG. 2. In other embodiments, Ethernet traffic management device 100 may be formed on a single substrate along with host processor 107 as shown by dotted line 200A in FIG. 2.

The term "deterministic" utilized herein pertains to time. A micro-controller that is "deterministic" is one in which every time a sequence of events is to occur, then the time that it takes to perform that sequence of events will always be the same or the variation in time will not be significant. One deterministic feature of a micro-controller is that every instruction in the deterministic architecture of the present invention takes a fixed period of time, regardless of its inputs.

Various embodiments of the invention have been described herein. It will be appreciated by those skilled in the art that the invention is not limited to the embodiments shown and described. It will also be appreciated by those skilled in the art that various changes and modifications may be made without departing from the spirit or scope of the invention. It is intended that the invention be limited only by the claims appended hereto.

The invention claimed is:

1. An Ethernet traffic management device, comprising:
a first port;
a second port;
a third port;
a first deterministic multi-threaded micro-controller controlling traffic through said first port;
a second deterministic multi-threaded micro-controller controlling traffic through said second port;
a third deterministic multi-threaded micro-controller controlling traffic through said third port;
said first deterministic multi-threaded micro-controller comprises a first hardware thread allocated to manage incoming data packets on said first port and a second hardware thread allocated to manage outgoing data packets on said first port, each of said first and second hardware threads are managed in hardware such that each of said first and second hardware thread executes an instruction on alternating clock cycles:
said second deterministic multi-threaded micro-controller comprises a first hardware thread allocated to manage incoming data packets on said second port and a second hardware thread allocated to manage outgoing data packets on said second port, each of said first and second hardware threads are managed in hardware such that each of said first and second hardware thread executes an instruction on alternating clock cycles:
said third deterministic multi-threaded micro-controller comprises a first hardware thread allocated to manage incoming data packets on said first port and a second hardware thread allocated to manage outgoing data packets on third port each of said first and second hardware threads are managed in hardware such that each of said first and second hardware thread executes an instruction on alternating clock cycles; and
said first deterministic multi-threaded micro-controller, said second deterministic multithreaded micro-controller, and said third deterministic multi-threaded micro-controller cooperatively operate to selectively communicate data packets between each of said first, second and third ports.

2. The Ethernet traffic management device in accordance with claim 1, comprising:
a single memory, said single memory configured such that packet data from each of said first, second and third ports is routed therethrough;
each of said first and second hardware threads comprises an independent interface to access said single memory, such that each of said first and second hardware threads does not interfere with memory accesses by others of said first and second hardware threads.

3. The Ethernet traffic management device in accordance with claim 2, wherein:
said first port and said second port are each coupleable in a network configured as one of a line topology, a ring topology or a star topology.

4. The Ethernet traffic management device in accordance with claim 3, wherein:
said third port is coupleable to a host processor.

5. The Ethernet traffic management device in accordance with claim 1, wherein:
said third port is coupleable to a host processor.

6. The Ethernet traffic management device in accordance with claim 1, comprising:
a memory, said memory configured to provide a first data path, such that packet data from each of said first, second and third ports is routed therethrough; and
a selectively operable second data path disposed between said first port and said second port to provide a selectively operable second data path between said first port and said second port.

7. The Ethernet traffic management device in accordance with claim 1, wherein:
each of said first deterministic multi-threaded micro-controller and said second deterministic multi-threaded microcontroller comprises a corresponding receive queue and a corresponding transmit queue; and
each of said first deterministic multi-threaded micro-controller and said second deterministic multi-threaded microcontroller is operable to determine that a packet received at its corresponding port is to be transmitted from that port to the port of the other of said first deterministic multi-threaded micro-controller and said second deterministic multi-threaded micro-controller and to transfer said packet to said transmit queue of said other of said first deterministic multi-threaded micro-controller and said second deterministic multi-threaded microcontroller.

8. The Ethernet traffic management device in accordance with claim 1, comprising:
a single memory, said single memory configured such that packet data from each of said first, second and third ports is routed therethrough.

9. The Ethernet traffic management device in accordance with claim 8, wherein:
said single memory is temporarily utilized at reset of said Ethernet traffic management device to receive and temporarily store firmware received via one of said first, second and third ports.

10. The Ethernet traffic management device in accordance with claim 9, comprising:
a control register associated with one of said first, second, and third ports, said control register is utilized to selectively load said firmware from said single memory to a first firmware memory associated with said first deterministic multi-threaded micro-controller, a second firmware memory associated with said second deterministic multi-threaded micro-controller, and a third firmware memory associated with said third microcontroller.

11. The Ethernet traffic management device in accordance with claim 9, wherein;
said third port is coupleable to a host processor.

12. The Ethernet traffic management device in accordance with claim 1, comprising:
a single memory, said single memory configured such that packet data from each of said first, second and third ports is routed therethrough;
said first port and said second port are each coupleable in an Ethernet network configured as one of a line topology or a redundant star topology; and
said third port is coupleable to a host processor.

13. The Ethernet traffic management device in accordance with claim 12, comprising:
a set of dedicated communication queues organized to provide communication channels between each of said first, second and third deterministic multi-threaded micro-controllers; and
said communication channels are utilized to communicate at least one of mode information and traffic control information.

14. The Ethernet traffic management device in accordance with claim 13, comprising:
a single substrate on which said Ethernet traffic management device is formed.

15. The Ethernet traffic management device in accordance with claim 13, comprising:
said single memory configured to provide a first data path, such that packet data from each of said first, second and third ports is routed therethrough; and
a path disposed between said first port and said second port to provide a selectively operable second data path between said first port and said second port.

16. The Ethernet traffic management device in accordance with claim 15, wherein:
each of said first deterministic multi-threaded micro-controller and said second deterministic multi-threaded microcontroller comprises a corresponding receive queue and a corresponding transmit queue; and
each of said first deterministic multi-threaded micro-controller and said second deterministic multi-threaded microcontroller is operable to determine that a packet received at its corresponding port is to be transmitted from that port to the port of the other of said first deterministic multi-threaded micro-controller and said second deterministic multi-threaded micro-controller and to transfer said packet to said transmit queue of said port of said other of said first deterministic multi-threaded micro-controller and said second deterministic multi-threaded micro-controller.

17. The Ethernet traffic management device in accordance with claim 16, comprising:
a single substrate on which said Ethernet traffic management device is formed.

18. The Ethernet traffic management device in accordance with claim 1, comprising:
said first port and said second port are each coupleable in an Ethernet network configured as one of a line topology, a ring topology, a redundant star topology; and
said third port is coupleable to a host processor.

19. The Ethernet traffic management device in accordance with claim 18, comprising:
a set of dedicated communication queues organized to provide communication channels between each of said first, second and third deterministic micro-controllers; and
said communication channels are utilized to communicate at least one of mode information and traffic control information.

20. An Ethernet traffic management device, comprising:
a first port;
a second port;
a third port;
a first deterministic multi-threaded micro-controller controlling traffic through said first port;
a second deterministic multi-threaded micro-controller controlling traffic through said second port;
a third deterministic multi-threaded micro-controller controlling traffic through said third port;
said first deterministic multi-threaded micro-controller comprises a first hardware thread allocated to manage incoming data packets on said first port and a second hardware thread allocated to manage outgoing data packets on said first port, each of said first and second hardware threads are managed in hardware such that each of said first and second hardware thread executes an instruction on alternating clock cycles;
said second deterministic multi-threaded micro-controller comprises a first hardware thread allocated to manage incoming data packets on said second port and a second hardware thread allocated to manage outgoing data packets on said second port each of said first and second hardware threads are managed in hardware such that each of said first and second hardware thread executes an instruction on alternating clock cycles:
said third deterministic multi-threaded micro-controller comprises a first hardware thread allocated to manage incoming data packets on said first port and a second hardware thread allocated to manage outgoing data packets on third first port, each of said first and second hardware threads are managed in hardware such that each of said first and second hardware thread executes an instruction on alternating clock cycles:
said first deterministic multi-threaded micro-controller, said second deterministic multithreaded micro-controller, and said third deterministic multi-threaded micro-controller cooperatively operate to selectively communicate data packets between each of said first, second and third ports; and
a substrate on which said Ethernet traffic management device is formed.

21. The Ethernet traffic management device in accordance with claim 20, comprising:
a single memory, said single memory configured such that packet data from each of said first, second and third ports is routed therethrough;
each of said first and second hardware threads comprises an independent interface to access said single memory, such that each of said first and second hardware threads does not interfere with memory accesses by others of said first and second hardware threads.

22. The Ethernet traffic management device in accordance with claim 21, wherein:
said first port and said second port are each coupleable in a network configured as one of a line topology, a ring topology or a redundant star topology.

23. The Ethernet traffic management device in accordance with claim 22, wherein:
said third port is coupleable to a host processor.

24. The Ethernet traffic management device in accordance with claim 21, wherein:
said third port is coupleable to a host processor.

25. The Ethernet traffic management device in accordance with claim 24, comprising:
said single memory is configured to provide a first data path, such that packet data from each of said first, second and third ports is routed therethrough; and
a path disposed between said first port and said second port to provide a selectively operable second data path between said first port and said second port.

26. The Ethernet traffic management device in accordance with claim 25, wherein:
each of said first deterministic multi-threaded micro-controller and said second deterministic multi-threaded microcontroller comprises a corresponding receive queue and a corresponding transmit queue; and
each of said first deterministic multi-threaded micro-controller and said second deterministic multi-threaded microcontroller is operable to determine that a packet received at its corresponding port is to be transmitted from that port to the port of the other of said first deterministic multi-threaded micro-controller and said second deterministic multi-threaded micro-controller and to transfer said packet to said transmit queue of said other of said first deterministic multi-threaded micro-controller and said second deterministic multi-threaded microcontroller.

27. The Ethernet traffic management device in accordance with claim 24, comprising:
a single memory, said single memory configured such that packet data from each of said first, second and third ports is routed therethrough.

28. The Ethernet traffic management device in accordance with claim 27, wherein:
said single memory is temporarily utilized at reset of said device to receive and temporarily store firmware received via one of said first, second and third ports.

29. The Ethernet traffic management device in accordance with claim 28, comprising:
a control register associated with one of said first, second, and third ports, said control register is utilized to selectively load said firmware from said single memory to a first firmware memory associated with said first deterministic multi-threaded micro-controller, a second firmware memory associated with said second deterministic multi-threaded micro-controller, and a third firmware memory associated with said third deterministic multi-threaded microcontroller.

30. The Ethernet traffic management device in accordance with claim 24, comprising:
said first port and said second port are each coupleable in an Ethernet network configured as one of a line topology and a redundant star topology.

31. The Ethernet traffic management device in accordance with claim 30, comprising:
said single memory is configured to provide a first data path, such that packet data from each of said first, second and third ports is routed therethrough; and
a path disposed between said first port and said second port to provide a selectively operable second data path between said first port and said second port.

32. The Ethernet traffic management device in accordance with claim 31, wherein:
each of said first deterministic multi-threaded micro-controller and said second deterministic multi-threaded microcontroller comprises a corresponding receive queue and a corresponding transmit queue; and
each of said first deterministic multi-threaded micro-controller and said second deterministic multi-threaded microcontroller is operable to determine that a packet received at its corresponding port is to be transmitted from that port to the port of the other of said first deterministic multi-threaded micro-controller and said second deterministic multi-threaded micro-controller and to transfer said packet to said transmit queue of said other of said first deterministic multi-threaded micro-controller and said second deterministic multi-threaded microcontroller.

33. The Ethernet traffic management device in accordance with claim 23, comprising:
a set of dedicated communication queues organized to provide communication channels between each of said first, second and third deterministic multi-threaded micro-controllers; and
said communication channels are utilized to communicate at least one of mode information and traffic control information.

34. An Ethernet apparatus, comprising:
a first port coupleable to an Ethernet network;
a second port coupleable to said Ethernet network;
a third port coupleable to a host processor;
a first deterministic multi-threaded micro-controller controlling traffic through said first port;
a second deterministic multi-threaded micro-controller controlling traffic through said second port;
a third deterministic multi-threaded micro-controller controlling traffic through said third port;
each of said first, second, and third deterministic multi-threaded micro-controllers comprises a first hardware thread allocated to manage incoming data packets on its associated port and a second hardware thread allocated to manage outgoing data packets on said associated port, each of said first and second hardware threads are managed in hardware such that each of said first and second hardware threads executes an instruction on alternating clock cycles; and
said first deterministic multi-threaded micro-controller, said second deterministic multithreaded micro-controller, and said third deterministic multi-threaded micro-controller cooperatively operate to selectively communicate data packets between each of said first, second and third ports.

35. The Ethernet apparatus in accordance with claim 34, comprising:
a host microprocessor.

36. The Ethernet apparatus in accordance with claim 34, comprising:
a set of dedicated communication queues organized to provide communication channels between each of said deterministic micro-controllers; and
said communication channels are utilized to communicate at least one of mode information and traffic control information.

37. The Ethernet apparatus in accordance with claim 36, comprising:
a host microprocessor; and
an interface coupling said host microprocessor and said third port.

38. The Ethernet apparatus in accordance with claim 36, comprising:

each of said first, second, and third deterministic multi-threaded micro-controllers is operable to perform one or more of modify, extend, reduce, and reformat data between one of said first, second, and third ports and another one of said first, second and third ports.

39. The Ethernet apparatus in accordance with claim 38, comprising:
a host microprocessor; and
an interface to said host microprocessor and said third port.

40. The Ethernet apparatus in accordance with claim 34, comprising:
each of said first, second, and third deterministic multi-threaded micro-controllers is operable to perform one or more of modify, extend, reduce, and reformat data between one of said first, second, and third ports and another one of said first, second and third ports.

41. The Ethernet apparatus in accordance with claim 40, comprising:
a host microprocessor; and
an interface to said host microprocessor and said third port.

42. The Ethernet apparatus in accordance with claim 34, comprising:
a memory, said memory configured such that packet data from each of said first, second and third ports is routed therethrough.

43. The Ethernet apparatus in accordance with claim 42, wherein:
said memory is temporarily utilized at reset of said device to receive and temporarily store firmware received via one of said first, second and third ports.

44. The Ethernet apparatus in accordance with claim 43, wherein:
said memory is utilized to provide one or more of maintaining a static forwarding table, maintaining dynamic forwarding table, emulating one or more protocol specific registers, maintain lists utilized for program variable maintenance.

45. The Ethernet apparatus in accordance with claim 34, comprising:
said memory configured to provide a first data path, such that packet data from each of said first, second and third ports is routed therethrough; and
a path disposed between, said first port and said second port to provide a selectively operable second data path between said first port and said second port.

46. The Ethernet apparatus in accordance with claim 45, wherein:
each of said first deterministic multi-threaded micro-controller and said second deterministic multi-threaded microcontroller comprises a corresponding receive queue and a corresponding transmit queue; and
each of said first deterministic multi-threaded micro-controller and said second deterministic multi-threaded microcontroller is operable to determine that a packet received at its corresponding port is to be transmitted from that port to the port of the other of said first deterministic multi-threaded micro-controller and said second deterministic multi-threaded micro-controller and to transfer said packet to said transmit queue of said other of said first deterministic multi-threaded micro-controller and said second deterministic multi-threaded microcontroller.

47. The Ethernet apparatus in accordance with claim 44, comprising:
a host microprocessor; and
an interface to said host microprocessor and said third port.

48. The Ethernet apparatus in accordance with claim 42, wherein:
said memory is utilized to provide one or more of maintaining a static forwarding table, maintaining a dynamic forwarding table, emulating one or more protocol specific registers, and maintaining lists utilized for program variable maintenance.

49. The Ethernet apparatus in accordance with claim 48, comprising:
each of said first, second, and third deterministic multi-threaded micro-controllers is operable to perform one or more of modify, extend, reduce, and reformat data between one of said first, second, and third ports and another one of said first, second and third ports.

50. An Ethernet apparatus, comprising:
a first port coupleable to an Ethernet network;
a second port coupleable to said Ethernet network;
a third port coupleable to a host processor;
a first deterministic multi-threaded micro-controller controlling traffic through said first port;
a second deterministic multi-threaded micro-controller controlling traffic through said second port;
a third deterministic multi-threaded micro-controller controlling traffic through said third port;
each of said first second, and third deterministic multi-threaded micro-controllers comprises a first hardware thread allocated to manage incoming data packets on its associated port and a second hardware thread allocated to manage outgoing data packets on said associated port, each of said first and second hardware threads are managed in hardware such that each of said first and second hardware threads executes an instruction on alternating clock cycles:
said first deterministic multi-threaded micro-controller, said second deterministic multithreaded micro-controller, and said third deterministic multi-threaded micro-controller cooperatively operate to selectively communicate data packets between each of said first, second and third ports; and
a substrate upon which said Ethernet apparatus is formed.

51. The Ethernet apparatus in accordance with claim 50, comprising:
a host microprocessor.

52. The Ethernet apparatus in accordance with claim 50, comprising:
a set of dedicated communication queues organized to provide communication channels between each of said deterministic micro-controllers; and
said communication channels are utilized to communicate at least one of mode information and traffic control information.

53. The Ethernet apparatus in accordance with claim 52, comprising:
a host microprocessor; and
an interface to said host microprocessor and said third port.

54. The Ethernet apparatus in accordance with claim 52, comprising:
each of said first, second, and third deterministic multi-threaded micro-controllers is operable to perform one or more of modify, extend, reduce, and reformat data between one of said first, second, and third ports and another one of said first, second and third ports.

55. The Ethernet apparatus in accordance with claim 54, comprising:
a host microprocessor; and
an interface to said host microprocessor and said third port.

56. The Ethernet apparatus in accordance with claim 50, comprising:
each of said first, second, and third deterministic multi-threaded micro-controllers is operable to perform one or more of modify, extend, reduce, and reformat data between one of said first, second, and third ports and another one of said first, second and third ports.

57. The Ethernet apparatus in accordance with claim 56, comprising:
a host microprocessor; and
an interface to said host microprocessor and said third port.

58. The Ethernet apparatus in accordance with claim 50, comprising:
a memory, said memory configured such that packet data from each of said first, second and third ports is routed therethrough.

59. The Ethernet apparatus in accordance with claim 58, wherein:
said memory is temporarily utilized at reset of said device to receive and temporarily store firmware received via one of said first, second and third ports.

60. The Ethernet apparatus in accordance with claim 59, wherein:
said memory is utilized to provide one or more of maintaining a static forwarding table, maintaining dynamic forwarding table, emulating one or more protocol specific registers, maintain lists utilized for program variable maintenance.

61. The Ethernet apparatus in accordance with claim 60, comprising:
a host microprocessor; and
an interface to said host microprocessor and said third port.

62. The Ethernet apparatus in accordance with claim 58, wherein:
said memory is utilized to provide one or more of maintaining a static forwarding table, maintaining a dynamic forwarding table, emulating one or more protocol specific registers, maintain lists utilized for program variable maintenance.

63. The Ethernet apparatus in accordance with claim 62, comprising:
each of said first, second, and third deterministic multi-threaded micro-controllers is operable to perform one or more of modify, extend, reduce, and reformat data between one of said first, second, and third ports and another one of said first, second and third ports.

64. The Ethernet apparatus in accordance with claim 50, comprising:
a memory, said memory configured to provide a first data path, such that packet data from each of said first, second and third ports is routed therethrough; and
a path disposed between said first port and said second port to provide a selectively operable second data path between said first port and said second port.

65. The Ethernet apparatus in accordance with claim 64, wherein:
each of said first deterministic multi-threaded micro-controller and said second deterministic multi-threaded micro-controller comprises a corresponding receive queue and a corresponding transmit queue; and each of said first deterministic multi-threaded microcontroller and said second deterministic multi-threaded micro-controller is operable to determine that a packet received at its corresponding port is to be transmitted from that port to the port of the other of said first deterministic multi-threaded microcontroller and said second deterministic multi-threaded micro-controller and to transfer said packet to said transmit queue of said other of said first deterministic multi-threaded micro-controller and said second deterministic multi-threaded micro-controller.

* * * * *